Oct. 13, 1959     A. R. MULLIN     2,908,444

ROTARY LAWN MOWER SPRAYING ATTACHMENT

Filed Aug. 9, 1956

Archie R. Mullin
INVENTOR.

BY
Attorneys

# United States Patent Office 2,908,444
Patented Oct. 13, 1959

2,908,444

ROTARY LAWN MOWER SPRAYING ATTACHMENT

Archie R. Mullin, Neodesha, Kans.

Application August 9, 1956, Serial No. 603,094

4 Claims. (Cl. 239—223)

This invention relates in general to lawn treating devices and more particularly to an attachment for rotary lawn mowers intended for dispensing liquid fertilizer or weed killer to a lawn.

Heretofore many types of devices have been utilized on lawn mowers, both motorized and hand powered, the intended purpose being to spray insecticide, fertilizers, and weed killers on the lawn. These devices have been attached to the exhaust of gasoline engines, special pumps and spray devices, and gravity fed pipe lines. However, one of the main drawbacks in all of the devices used previously has been that the dispensed material was thrown about rather haphazardly, which is especially detrimental when dispensing weed killer which also acts on broad leaf flowers. Oftentimes rather expensive flowers have been killed in this manner. Further, when additional pumps or exhaust attachments are used in connection with small power plants utilized on lawn mowers, a definite drop in efficiency is encountered and a poor job of lawn mowing results or undue strain is placed on the power plant.

Therefore, the primary object of this invention is to provide a spraying attachment for rotary lawn mowers which will dispense liquid material to a confined and controlled area of the gardener's choosing.

A further object of this invention is to provide an attachment for rotary lawn mowers which may be easily and quickly attached to existing lawn mowers with a minimum of effort.

A still further object of this invention is to provide a rotary lawn mower attachment which will not rob power from the motor thereof.

Yet another object of this invention is to provide a spraying attachment for rotary lawn mowers which will not affect the normal use of the lawn mower whether a liquid is being sprayed or not.

Yet another object of this invention is to provide a spraying attachment which is efficient in operation, easy to install, and requires little or no maintenance for continuing efficient operation.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
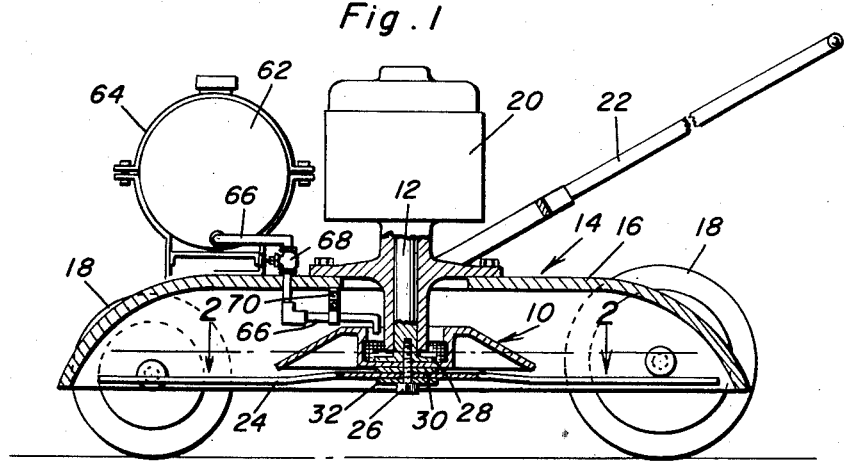
Figure 1 is a side elevation of a vertical shaft lawn mower taken substantially along the longitudinal center line of the mower showing the spraying attachment attached to the vertical drive shaft of the mower, with portions broken away for clarity.
Figure 2:
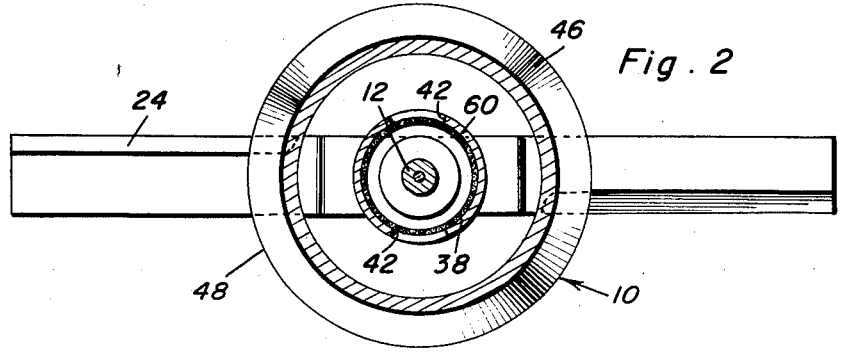
Figure 2 is an enlarged vertical sectional view taken substantially along section line 2—2 of Figure 1.

Referring now to the drawings in detail it will be noted that the spraying attachment, which is referred to in general by the reference numeral 10, is attached to a vertical drive shaft 12 of a lawn mower, which is referred to in general by the reference numeral 14. The lawn mower 14 is provided with a frame 16, carried by wheels 18 and is provided with a power plant 20. The mower 14 is also provided with an operating handle 22 and a cutting blade 24.

The blade 24 is normally retained on the shaft 12 by means of a bolt 26 which is received in the lower end of the shaft 12. To prevent slipping of the blade the shaft 12 is provided at its lower extremity with a flange 28 and washers 30 and 32 with the blade 24 disposed between the washers.

As is best seen in Figure 1, the spraying attachment 10 is attached to the lower extremity of the vertical drive shaft 12 and is disposed between the flange 28 and the washer 30.

Figure 3:
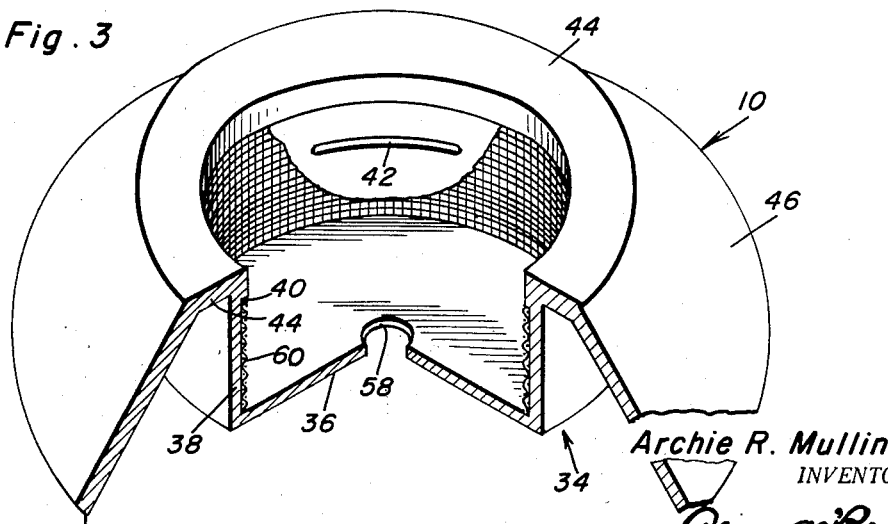
Figure 3 is a still further enlarged view of the spraying attachment with parts broken away for clarity.

As is best seen in Figure 3, the main body portion, which is cup shaped in configuration, is referred to in general by the reference numeral 34. The body 34 consists of an annular base 36 and an upstanding wall 38 which is formed integral with the base 36. The inner surface of the wall 38 is provided with a step 40 adjacent the upper edge thereof, the purpose of which will be described hereinafter. The wall 38 is also provided with a plurality of circumferential slots or orifices 42, intermediate the base 36 and step 40. When installed on the mower 14 the base 36 is disposed in a horizontal plane. The wall 38 terminates in a horizontal ring 44 which extends outward from the wall 38, at approximately right angles. Formed integral with the ring 44, and extending outward and downwardly therefrom is a deflecting ring 46 which terminates in a lower edge 48. The lower edge 48 is in coplanar relation to the base 36. The base 36 has provided therein a centrally located hole 58 through which the bolt 26 passes when the spraying attachment is attached to the lawn mower 14. It should be understood that the hole 58, the wall 38 and the outer edge 48 are all concentric. Ordinarily, when the spraying attachment is being utilized, there is a possibility that the orifices 42 would become clogged from grass cuttings and therefore a screen 60 is provided which is placed inside the wall 38 and is retained therein by means of the previously mentioned step 40.

Mounted on the frame 16 is a supply tank 62 which is retained thereon by a bracket or brackets 64. A supply pipe 66 is provided adjacent the lower extremity of the tank 62. The supply pipe 66 terminates above the cup shaped member 34 and has disposed intermediate the ends thereof a control valve 68. For additional support of the supply pipe 66 there is provided a mounting bracket 70 beneath the frame 16 of the mower.

In operation, the supply tank 62 is filled with a liquid of the gardener's choosing, fertilizer, insect spray or weed killer and the mower is started. For test purposes the mower 14 may be placed on a concrete driveway or side walk and the valve 68 opened to allow a small amount of the liquid to flow into the spraying attachment. Centrifugal force carries the liquid to the walls 38' then through the orifices 42 and finally, outwardly to the deflecting ring 46 which deflects the liquid droplets downward to the area to be treated. After proper regulation of the valve 68 the grass may be mowed in the ordinary manner with the liquid being dispensed beneath the mower only. As previously mentioned, the screen 60 prevents clogging of the orifices 42 by grass particles or other debris.

Inasmuch as the spraying attachment is symmetrical in configuration and light in construction relatively little power is robbed from the power plant when the spraying attachment is being utilized. Further, the spraying attachment is out of the way in the event the gardener is desirous of mowing the grass without fertilization or spraying of any kind.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a spraying assembly provided with a support rotatably carrying a vertical drive shaft, a spray head including a central, cup-shaped body having a circular bottom and a cylindrical side wall integral with the peripheral extremity of the bottom and extending upwardly therefrom, the upper circular margin of the side wall defining an opening, and a substantially frusto-conical, imperforate deflecting ring surrounding said body, said ring progressively increasing in diameter from the upper circular edge thereof to the lower circular edge of the same, the upper circular edge of the ring being integral with said upper margin of the side wall and the lower circular margin of the ring terminating adjacent a plane through said bottom, the head being adapted to be mounted on the shaft for rotation therewith with said ring and the body coaxial with the same; and liquid material supply means adapted to be mounted on the support and including structure for delivering said material from said supply means into said body, said side wall of the body being provided with orifice means for permitting material directed into the body to move outwardly into said deflecting ring during rotation of the head.

2. A spraying assembly as set forth in claim 1 wherein said structure includes elongated conduit means connected to the supply means and having the outermost end thereof extending into said opening defined by the upper circular margin of said side wall of the body.

3. A spraying assembly as set forth in claim 2 wherein is provided a filter screen within the body and disposed over said orifice means for preventing cuttings from entering the body through said orifice means.

4. A spraying assembly as set forth in claim 3 wherein said orifice means in the side wall consist of a plurality of circumferentially spaced, narrow, elongated, horizontal slots.

References Cited in the file of this patent

UNITED STATES PATENTS

| | | |
|---|---|---|
| 990,335 | Cantwell | Apr. 25, 1911 |
| 1,751,531 | Schars | Mar. 25, 1930 |
| 1,869,296 | Beiler | July 26, 1932 |
| 2,573,784 | Asbury | Nov. 6, 1951 |
| 2,711,926 | Allander | June 28, 1955 |
| 2,742,751 | Laughlin | Apr. 24, 1956 |
| 2,783,088 | Butler | Feb. 26, 1957 |

FOREIGN PATENTS

| | | |
|---|---|---|
| 662,303 | France | Mar. 18, 1929 |
| 703,441 | Germany | Mar. 8, 1941 |
| 658,687 | Great Britain | Oct. 10, 1951 |
| 1,067,049 | France | Jan. 27, 1954 |